(12) United States Patent
Audet

(10) Patent No.: US 7,331,418 B2
(45) Date of Patent: Feb. 19, 2008

(54) RETRACTABLE PASSENGER SEAT FOR AN ATV

(75) Inventor: Mathieu Audet, Montreal (CA)

(73) Assignee: Bombardier Recreational Products Inc., Valcourt (CA)

( * ) Notice: Subject to any disclaimer, the term of this patent is extended or adjusted under 35 U.S.C. 154(b) by 479 days.

(21) Appl. No.: 10/796,392

(22) Filed: Mar. 8, 2004

(65) Prior Publication Data

US 2004/0173653 A1    Sep. 9, 2004

Related U.S. Application Data

(60) Provisional application No. 60/452,498, filed on Mar. 7, 2003.

(51) Int. Cl.
  *B60N 2/20*    (2006.01)
(52) U.S. Cl. .............. 180/312; 296/65.09; 297/215.12
(58) Field of Classification Search ............ 297/195.1, 297/240, 243, 236, 232, 353, 378.1, 354.1, 297/215.1, 215.11–215.13, 124, 125, 118, 297/129; 296/69, 65.01, 65.05, 65.09; 280/781; 180/312

See application file for complete search history.

(56) References Cited

U.S. PATENT DOCUMENTS

| | | | |
|---|---|---|---|
| 3,873,127 A * | 3/1975 | McNichol et al. .......... 280/202 |
| 4,527,831 A * | 7/1985 | Katsuoka .................... 297/243 |
| 4,690,237 A * | 9/1987 | Funabashi et al. .......... 180/219 |
| 4,804,221 A * | 2/1989 | Saiki ........................ 297/284.9 |
| 4,953,911 A * | 9/1990 | Hanagan ................. 297/215.12 |
| 5,094,315 A * | 3/1992 | Taki et al. .................. 180/219 |
| 6,068,334 A | 5/2000 | Bonfilio |
| 6,601,900 B1 * | 8/2003 | Seibold .................... 296/65.09 |
| 2004/0031640 A1 * | 2/2004 | Tweet ......................... 180/311 |
| 2004/0256897 A1 * | 12/2004 | Ziegler .................. 297/215.12 |
| 2005/0247506 A1 * | 11/2005 | Rondeau et al. ............ 180/312 |

* cited by examiner

Primary Examiner—Paul N. Dickson
Assistant Examiner—Drew J. Brown
(74) Attorney, Agent, or Firm—Osler, Hoskin & Harcourt LLP

(57) ABSTRACT

An all terrain vehicle has a passenger seat directly behind the driver's seat. The passenger seat comprises a contoured seat portion that serves as a back rest to the driver's seat and a foldable back rest portion. The seat portion is linked to the back rest portion so that it retracts vertically when the back rest portion is folded down, so that the back rest portion is level with the rear cargo rack and able to carry a load of cargo. The back rest may be locked in both the upright and folded position. It may be contoured to provide back support to the driver while folded, and may have an auxiliary cargo rack in its rear face.

19 Claims, 2 Drawing Sheets

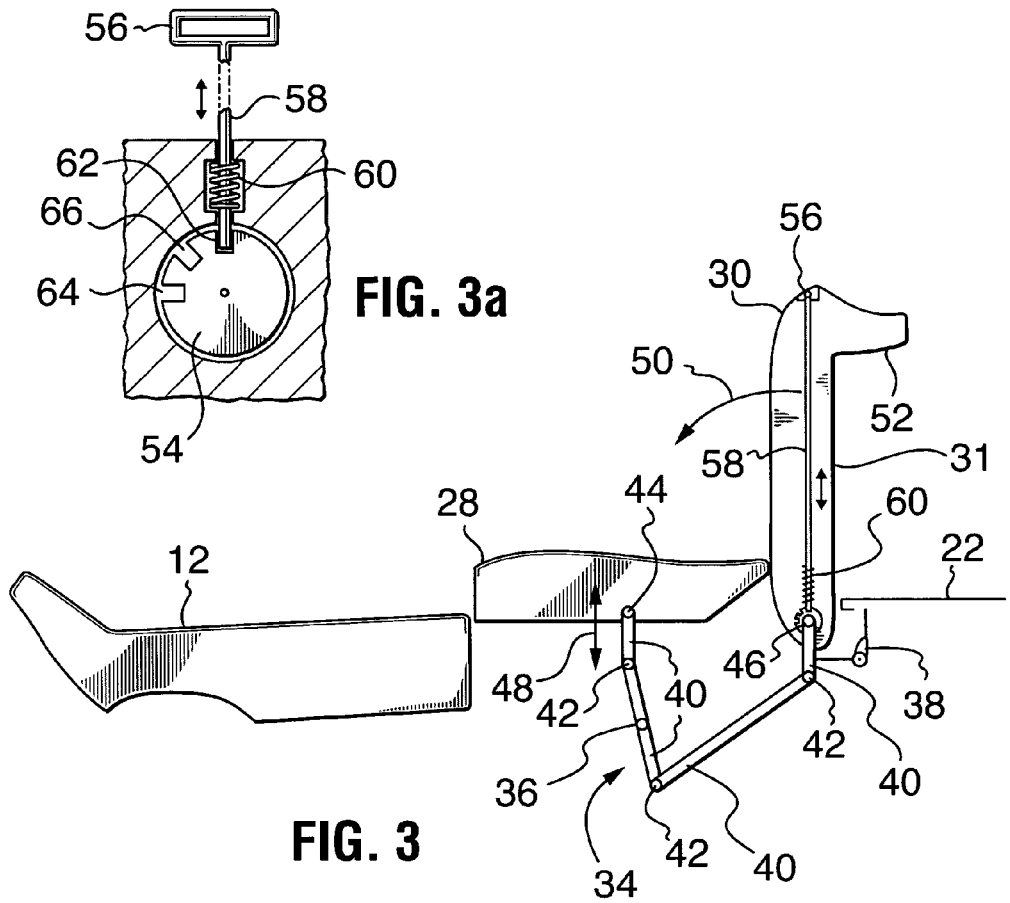
FIG. 3a
FIG. 3
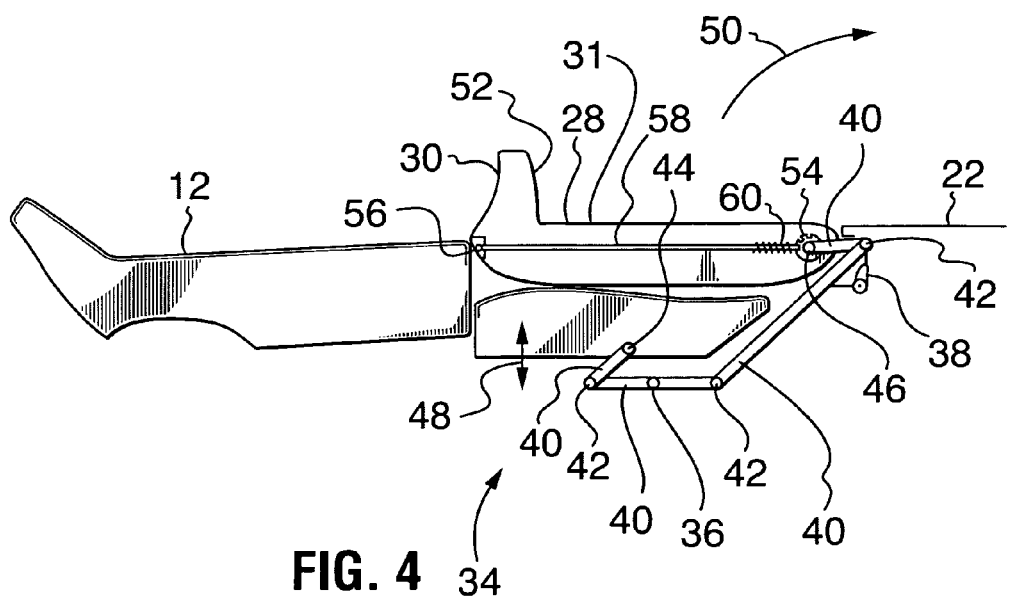
FIG. 4

RETRACTABLE PASSENGER SEAT FOR AN ATV

CROSS-REFERENCE TO RELATED APPLICATIONS

This application claims priority from U.S. Provisional Patent Application No. 60/452,498 filed Mar. 7, 2003 by Mathieu Audet and entitled REMOVABLE AND RETRACTABLE PASSENGER SEAT FOR AN ATV. This application is incorporated by reference herein.

TECHNICAL FIELD

The present invention relates generally to a wheeled vehicle adapted to traverse a variety of terrain. The invention particularly relates to straddle-type vehicles common known as all-terrain vehicles (ATVs), and more particularly to multi-passenger ATVs.

BACKGROUND OF THE INVENTION

ATVs have become very popular consumer products in recent years. These vehicles are typically used to travel undeveloped terrain, often called "off-road" connoting the lack of paved or even defined paths. An ATV is typically a small straddle-seated multi-wheeled vehicle, having handlebar steering. Conventionally, ATVs have been single-rider vehicles, with the operator situated athwart the central column of the vehicle, between the front and rear axles, on a backless seat.

Because of the versatility of ATVs in negotiating diverse types of terrain, ATVs are used for both off-road work and recreation applications that require the provision of cargo space. This cargo space is typically situated behind or in front of the operator in the form of one or more flat cargo racks.

On occasion, it would be desirable to transport a passenger on an ATV. Because the single seat provided is somewhat larger than would be required for an operator alone, there is a temptation to carry a passenger on the same seat, directly behind the driver. However, especially in light of the rugged terrain that must be traversed, doing so introduces a significant stability issue.

There have been attempts to provide after-market passenger seats that may be bolted to the cargo rack behind the driver's seat. However, in order to maintain the passenger's stability, elaborate and complicated locking systems are required, thus incurring time and inconvenience in installing and removing the seat.

In U.S. patent application Ser. No. 10/292,813 by Rondeau et al assigned to the assignee of the present invention and incorporated by reference herein, there is disclosed an extended wheelbase ATV which provides sufficient room between the front and rear axles to accommodate, in-line, both a driver and passenger seat. Because both the driver and passenger seating positions are centred over the ATV, the centre of gravity of the vehicle remains centred, providing a more comfortable ride for both riders and maximizing the passenger's safety. Also incorporated herein by reference is PCT Publication WO/03042026 by Portelance et al. which was published May 22, 2003.

However, in order to make sufficient space for a second seat, such ATVs generally have more limited cargo space than single passenger ATVs. As well, since the seat is contoured for a human passenger, it is not well suited to hauling cargo. It is not practical to unbolt the passenger seat from the ATV in order to increase cargo space. Thus, when the operator does not have a passenger to convey, the space now occupied by the passenger seat in such an ATV is largely wasted.

Additionally, there is a need for an ATV with a passenger seat that can be retracted or folded with minimal adjustment.

Furthermore, there is a need for an ATV with a passenger seat that can be adapted to carry cargo in the absence of a passenger.

Accordingly, there remains a need for an improved passenger seat on an ATV.

SUMMARY OF THE INVENTION

It is therefore an object of the invention to provide a passenger seat on an ATV that may be retracted, folded or adapted to carry cargo when not required for passengers.

Thus as embodied and broadly described herein, the present invention provides a straddle-type wheeled vehicle comprising: a frame; at least three wheels supporting the frame, one of which is a front wheel and one of which is a rear wheel; an engine disposed on the frame for driving at least one of the wheels; handlebars disposed on the frame for steering at least one of the wheels; a straddle driver seat disposed on the frame; and a straddle passenger seat disposed on the frame rearward of the driver seat, the passenger seat being transformable between a first configuration in which the passenger seat is configured to accept a passenger and a second configuration in which the passenger seat is configured to accept cargo.

Preferably, the at least three wheels comprise at least four wheels, two of which are front wheels and two of which are rear wheels, the front wheels define a front axis and the rear wheels define a rear axis, a wheelbase is defined by the front axis and the rear axis and the wheelbase is not less than 55 inches. More preferably, the wheelbase is between 55 and 78 inches and the wheels includes a low-pressure balloon tire.

It is also preferred the passenger seat comprises a seat portion and a backrest, with the backrest being pivotable with respect to the seat portion between a substantially upright orientation and a substantially horizontal orientation. Under such conditions, the passenger seat will be in the first configuration when the backrest is in the upright orientation and will be in the second configuration when the backrest is the horizontal orientation.

More preferably the vehicle has a cargo rack rearward of the passenger seat, and when the backrest is in the horizontal orientation, the backrest is substantially level with the cargo rack.

Still more preferably, the vehicle has a cargo rearward of the passenger seat and the backrest has an auxiliary rack mounted to a rear thereof such that when the back rest is in the horizontal orientation, the auxiliary rack is substantially level with the cargo rack.

It is also preferred that the seat portion of passenger seat is movable between a first position and second position, the second position being lower than the first position, the seat portion being in the first position when the backrest is in the upright orientation and in the second position when the backrest is in the horizontal orientation.

It is also preferred that a contour of the seat portion of the passenger seat is configured to provide a back support for the driver seat, at least when the passenger seat is in the first configuration, and that a contour of the backrest of the passenger seat is configured to provide a back support for the driver seat when the passenger seat is in the second configuration.

Finally, it is preferable that the vehicle includes a locking mechanism constructed and arranged to lock the backrest into a desired orientation.

Further features and advantages of the present invention will become apparent from the following detailed description, taken in combination with the appended drawings.

BRIEF DESCRIPTION OF THE DRAWINGS

FIG. 3 is a schematic side view of the passenger seat mechanism permitting the movement of FIG. 1 while in the unfolded or passenger position;

FIG. 3A is a detailed view of the latch mechanism with the passenger seat mechanism of FIG. 3; AND FIG. 4 is a schematic side view of the passenger SEAT mechanism of FIG. 3 while in the folded or cargo position.

It will be noted that throughout the appended drawings, like features are identified by like reference numerals.

DETAILED DESCRIPTION OF THE PREFERRED EMBODIMENTS

Figure 1:
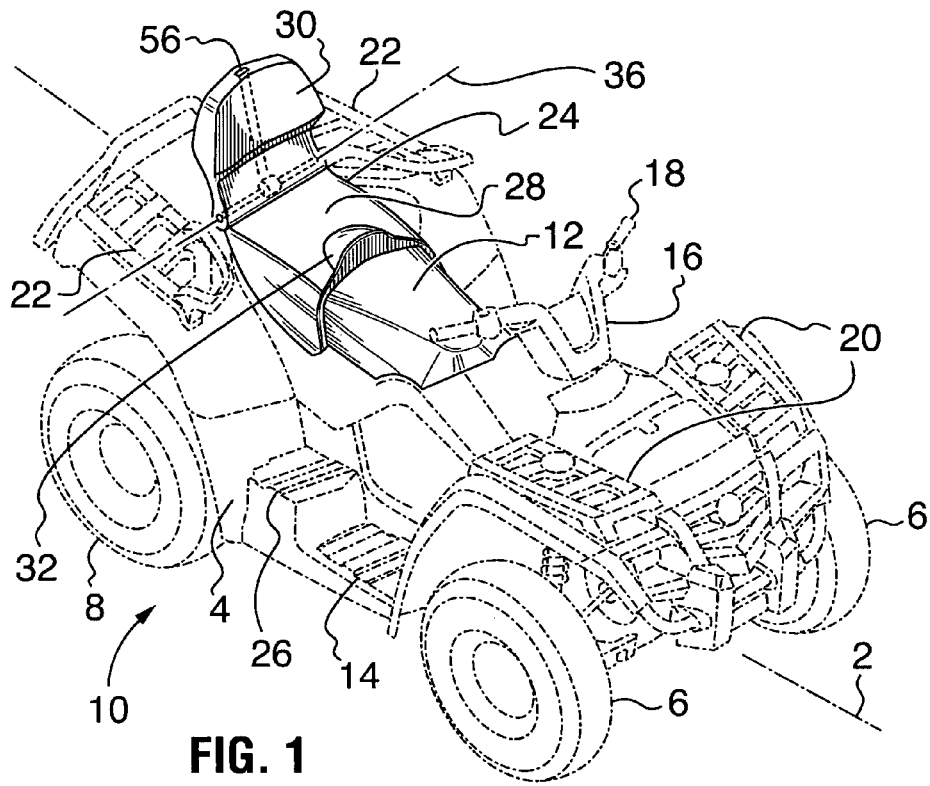
FIG. 1 is an isometric front-right view of an ATV incorporating an embodiment of the present invention.
Figure 2:
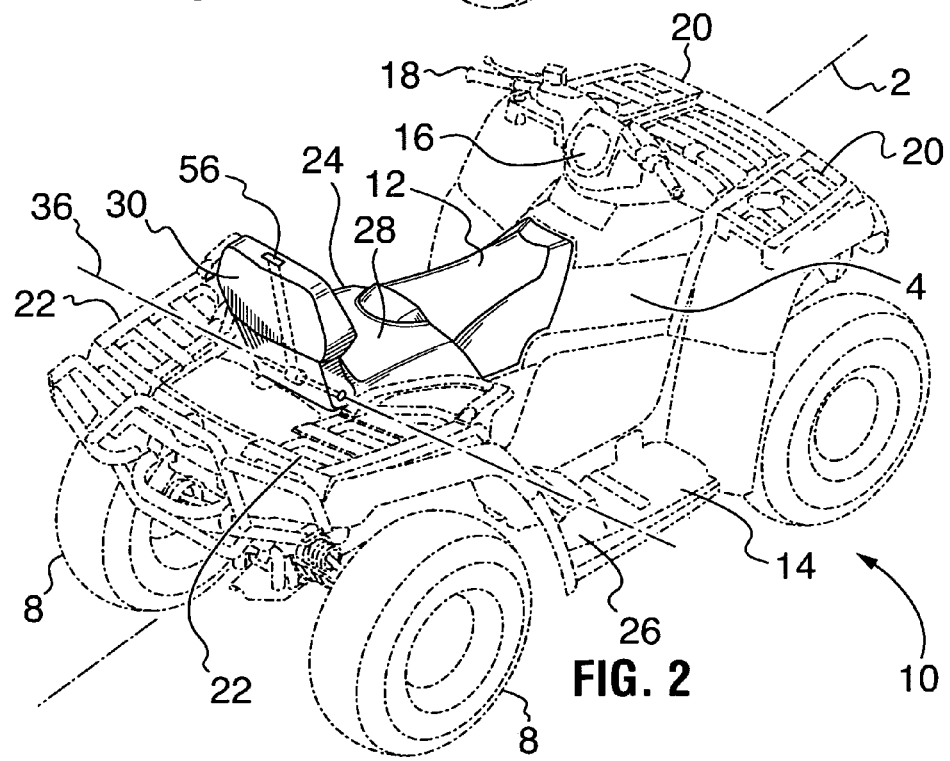
FIG. 2 is another isometric rear-right view of the ATV of FIG. 1.

FIG. 1 illustrates an exemplary embodiment of an ATV shown in phantom having a vertically retractable passenger seat in accordance with the present invention.

The ATV, shown generally at 10, comprises a main frame (not shown) defined by a longitudinal axis 2, the frame being largely covered by a body 4. The frame rotatably supports two front wheels 6 and two rear wheels 8. While the preferred configuration includes four wheels for enhanced stability, configurations involving two, three or more wheels may be possible. The wheel preferably have low-pressure balloon tires (i.e, between 1.5 and 4 psi). Preferably the ATV 10 has an extended wheelbase of between 55 and 72 inches.

A first or driver's seat 12 is supported by the frame in-line with its longitudinal axis 2. A driver may be supported by the driver's seat 12 in a straddle position with a leg on each side of driver's seat 12 and by driver footrests 14. The driver footrests 14 may be integral with the body 4 or comprise a separate component. Connected to the frame is a steering assembly 16, including handle bars 18, for use by the driver.

As can be seen in FIG. 1, driver's seat 12 is slightly convexly contoured, so as to facilitate the driver's ability to bear against the sides of the frame with his or her legs. Driver's seat 12 may be fixed to the frame, or alternatively, may be secured with a hinge and latch onto the frame with a latch assembly to provide access to components beneath driver's seat 12, which may include the battery compartment or additional storage areas.

Primary storage on the ATV 10 is provided by front cargo racks 20 and rear cargo racks 22 mounted to the body 4 substantially over the axes of the front wheels 6 and rear wheels 8 respectively. The front cargo rack 20 may have one or more portions over the fenders of the front wheels 6. Likewise, the rear cargo rack 22 may have one or more portions over the fenders of the rear wheels 8. Preferably, the front cargo rack 20 and the rear cargo rack 22 each substantially define a plane, so that a larger load may be evenly distributed over the different portions of the rack. Optionally, the front 20 and rear cargo racks 22 may be integral with the body 4.

A passenger seat 24 is provided behind driver seat 12 and generally ahead of rear cargo rack 22. A passenger may be supported by the passenger seat 24 in a straddle position with a leg on each side of passenger seat 24, and by passenger footrests 26, which are slightly raised and angled over the driver footrests 14 and may be integral therewith or a separate component.

Passenger seat 24 has a seat portion 28 and a back rest 30. Seat portion 28 shares a common dimension with the back of the driver's seat 12, against which it abuts.

While the driver of the ATV generally leans forward, in order to grasp the steering handle bars, there may be occasion, as when the ATV is used to traverse long distances over relatively level terrain, when the driver may wish to be more vertically inclined. Usually, however, this is an uncomfortable position because of the absence of any back support on the driver's seat. Thus, the seat portion 28 may have a slight convex bulge 32 at its front, so as to provide a slightly elevated region in the immediate region of the back of the driver's seat 12, against which the driver's back may rest. The bulge 32 may also provide a slight contour so as to facilitate the passenger's ability to bear against the sides of the ATV 10 with his or her legs.

Back rest 30 is pivotally mounted to the rear of seat portion 28 and able to be folded flat over it rotating around axis 33. Optionally, the profile of the back rest 30 may be in the form of an inverted "L" 52, so that when folded down, there remains a slightly elevated region in the immediate region of the back of the driver's seat 12.

In order to prevent the back rest 30 from folding over unintentionally, as when the passenger is small or leaning forward, a manually releasable latch 54 or other retention mechanism may be provided. The latch 54 precludes the back rest 30 from folding until the latch 54 is released by a release lever 56. Preferably the release lever 56 is a pull handle housed in the top of the back rest 30. A strike bar 58 is attached to the lever 56 and passes through the length of the back rest 30. As seen in FIG. 3, at the other end of the strike bar 58, a spring 60 biases the strike bar 58 downward and towards the latch 54.

The latch 54 is circular in shape and remains fixed in position and orientation irrespective of the orientation of the back rest 30. As shown in detail in FIG. 3A it has a plurality of gaps, 62, 64, 66, each adapted to accept the bottom end of the strike bar 58. One gap 62 is substantially upright and will be engaged by the strike bar 58 when the back rest 30 is in the upright position. A second gap 64 is substantially horizontal and will be engaged by the strike bar 58 when the back rest 30 is in the folded position. Optionally, there may be gaps such as 66, which are positioned at intermediate points along the arc defined by the first gap 62 and second gap 64. The latch 54 is positioned near the bottom of the back rest 30 and it does not rotate when the back rest 30 is folded.

There is also shown in FIG. 3 a schematic drawing of an exemplary linkage, shown generally at 34, interconnecting the back rest 30 with the seat portion 28. Linkage 34 has a fixed pivot point 36, which is attached to the frame, a locking mechanism 38 and a plurality of linkage members 40, interconnected by pivoting elements 42. One extremity 44 of the linkage 34 is attached to seat portion 28 and the other extremity 46 is attached to the back rest 30 to ensure the movement of the back rest 30 will affect the seat 28 position.

Linkage 34 links together seat portion 28 with back rest 30, so that application of downward pressure on the seat portion 28 while locking mechanism 38 is not engaged will permit the seat portion 28 to be vertically retracted, as shown in FIG. 3, along the path defined by arrow 48, so that when the back rest 30 is folded over it, its rear surface 31 is substantially level with rear cargo rack 22.

Alternatively, back rest 30 may be folded over seat portion 28 along the path defined by arrow 50 before downward pressure is applied to the back of back rest 30, to vertically retract the seat portion 28 along the path defined by arrow 48. The seat 28 vertical movement is maintained by sliding members (not shown) providing only movement in the direction allowed by linkage 34.

While in this retracted position as shown in FIG. 4, back rest 30 may be unfolded along the path defined by arrow 50. Thereafter, application of downward pressure on the back rest 30 while locking mechanism 38 is disengaged will permit the linkage 34 to vertically extend the seat portion 28 along the path defined by arrow 48.

Locking mechanism 38, when engaged, fixes the position of the linkage member 40 proximate to extremity 46 and precludes movement thereof even if the strike bar 58 is activated. While unlocked, however, all of the linkage members 40 are free to move, restricted only by the constraints of the strike bar 58, the axis 46, the pivot point 36 and the design of the linkage 34. Those having ordinary skill in this art will readily appreciate that the linkage 34 shown in FIGS. 3 and 4 are exemplary only, for the purpose of illustrating the inventive principle. The particular design and configuration of the linkage 34 suitable for a particular seat portion 28 and back rest 30 will be apparent to one of ordinary skill.

Because locking mechanism 38 fixes the position of the linkage member 40 proximate to extremity 46, and because this linkage member connects extremity 46 and the first pivoting element 42 proximate to back rest 40, when engaged, locking mechanism 38 may serve to preclude the folding or unfolding of back rest 30 relative to seat portion 28, thus preventing the back rest 30 from collapsing on a passenger while unfolded, or flipping upward while folded and may dispense with the need for any retention mechanism.

Alternatively, the locking mechanism 38 may only preclude the operation of the linkage 34 from vertically retracting or extending the seat portion 28, and the latch 54 may govern whether or not the back rest 30 is allowed to fold.

The latch 54 may alternatively be magnetically or electrically actuated so that it may be selectively engaged or released remotely by the locking mechanism 38 and in synchronization with it. As well, both the locking mechanism 38 and the latch 54 may then be remotely engaged or released by a button at the driver's console or elsewhere on the ATV or on a remote control (not shown).

It will be apparent to those skilled in this art that various modifications and variations may be made to the embodiments disclosed herein, consistent with the present invention, without departing from the spirit and scope of the present invention.

For example, the rear side 31 of back rest 30 may have a rack mounted onto it or integral therewith so that when the back rest 30 is folded down, the rack will be presented and cargo may be loaded thereon. Ribs on the rack adding strength to the backrest (not shown) and anchors providing attachment points for straps or hooks are also part of the back rest design.

Further, the passenger seat may be installed at an intermediate position designed to accommodate the majority of passengers. However, there may be passengers, who by reason of their physiques, require more or less legroom than is provided. For example, smaller persons may wish to have the seat positioned closer to the back of the driver's seat, in order to permit them to wrap their arms around the driver, as this is a primary mechanism of maintaining position on the ATV while negotiating pitching terrain. As well, extremely large passengers may require the seat positioned farther to the back of the ATV, in order to permit them to fully retract their legs to avoid injury. Thus, the linkage 34 directing the vertical retraction of the seat portion 28 could also be configured to permit the seat portion 28 to move forward or backward as required. The seat 28 vertical movement could be spring loaded offering an independent seat suspension to the passenger. The linkage 34 configuration may provide that the seat portion 28 move forward, rearward (or incline at the same time) as it is being vertically retracted.

Moreover, the passenger seat 24 may be made easily removable, such as by mounting the seat mechanism on a modular connector that engages a corresponding receptacle attached to the frame of the ATV 10. Preferably, the passenger seat 24 and the linkage 34 are designed such that the back rest 30 is allowed to fold along the path shown by arrow 50, relative to the connector, whether or not installed, and the seat portion 28 is allowed to vertically retract relative to the connector, whether or not installed. Such a modular connector and receptacle system is described in U.S. Provisional Patent Application No. 60,467,566 entitled MODULAR PARTS FOR AN ALL TERRAIN VEHICLE.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the appended claims.

What is claimed is:

1. A straddle-type wheeled vehicle comprising:
   a frame;
   at least three wheels supporting the frame, one of which is a front wheel and one of which is a rear wheel;
   an engine disposed on the frame for driving at least one of the wheels;
   handlebars disposed on the frame for steering at least one of the wheels;
   a straddle driver seat disposed on the frame;
   a straddle passenger seat disposed on the frame rearward of the driver seat, the passenger seat comprising a seat portion and a backrest, the passenger seat transformable between a first configuration in which the passenger seat is configured to accept a passenger and a second configuration in which the passenger seat is configured to accept cargo; and
   a cargo rack rearward of the passenger seat,
   the backrest being substantially level with the cargo rack when the backrest is in the second configuration.

2. The straddle-type wheeled vehicle as claimed in claim 1, wherein the at least three wheels comprise at least four wheels, two of which are front wheels and two of which are rear wheels, the front wheels define a front axis and the rear wheels define a rear axis, and a wheelbase is defined by the front axis and the rear axis.

3. The straddle-type wheeled vehicle as claimed in claim 2, wherein the wheelbase is not less than 55 inches.

4. The straddle-type wheeled vehicle as claimed in claim 3, wherein the wheelbase is between 55 and 78 inches.

5. The straddle-type wheeled vehicle as claimed in claim 4, wherein each of the wheels includes a low-pressure balloon tire.

6. The straddle-type wheeled vehicle as claimed in claim 5, wherein the backrest is pivotable with respect to the seat portion.

7. The straddle-type wheeled vehicle as claimed in claim 6, wherein the backrest pivots between a substantially upright orientation and a substantially horizontal orientation, the passenger seat being in the first configuration when the backrest is in the upright orientation and in the second configuration when the backrest is the horizontal orientation.

8. The straddle-type wheeled vehicle as claimed in claim 7, wherein the backrest further comprises an auxiliary rack mounted to a rear thereof such that when the back rest is in the horizontal orientation, the auxiliary rack is substantially level with the cargo rack.

9. The straddle-type vehicle as claimed in claim 7, wherein a contour of the seat portion of the passenger seat is configured to provide a back support for the driver seat, at least when the passenger seat is in the first configuration.

10. The straddle-type vehicle as claimed in claim 7, wherein a contour of the backrest of the passenger seat is configured to provide a back support for the driver seat when the passenger seat is in the second configuration.

11. The straddle-type wheeled vehicle as claimed in claim 7, further comprising a locking mechanism constructed and arranged to lock the backrest into a desired orientation.

12. The straddle-type vehicle as claimed in claim 1, wherein a contour of the seat portion of the passenger seat is configured to provide a back support for the driver seat, at least when the passenger seat is in the first configuration.

13. The straddle-type vehicle as claimed in claim 1, wherein a contour of the backrest of the passenger seat is configured to provide a back support for the driver seat when the passenger seat is in the second configuration.

14. The straddle-type wheeled vehicle of claim 1,
the seat portion being in a first seat position when the passenger seat is in the first configuration and in a second seat position when the passenger seat is in the second configuration, the second seat position being different from the first seat position; and
the backrest being pivotable about a pivot axis between a first backrest position and a second backrest position, the backrest being in the first backrest position when the passenger seat is in the first configuration and in the second backrest position when the passenger seat is in the second configuration,
the pivot axis being disposed lower than the cargo rack.

15. A straddle-type wheeled vehicle comprising:
a frame;
at least three wheels supporting the frame, one of which is a front wheel and one of which is a rear wheel;
an engine disposed on the frame for driving at least one of the wheels;
handlebars disposed on the frame for steering at least one of the wheels;
a straddle driver seat disposed on the frame; and
a straddle passenger seat disposed on the frame rearward of the driver seat, the passenger seat comprising a seat portion and a backrest, the passenger seat transformable between a first configuration in which the passenger seat is configured to accept a passenger and a second configuration in which the passenger seat is configured to accept cargo,
wherein the seat portion of passenger seat is movable between a first position and second position, at least a rear part of the seat portion being lower in the second position than in the first position, the seat portion being in the first position when the passenger seat is in the first configuration and in the second position when the passenger seat is in the second configuration.

16. A straddle-type wheeled vehicle comprising:
a frame;
at least three wheels supporting the frame, one of which is a front wheel and one of which is a rear wheel;
an engine disposed on the frame for driving at least one of the wheels;
handlebars disposed on the frame for steering at least one of the wheels;
a straddle driver seat disposed on the frame; and
a straddle passenger seat disposed on the frame rearward of the driver seat, the passenger seat comprising a seat portion and a backrest, the passenger seat transformable between a first configuration in which the passenger seat is configured to accept a passenger and a second configuration in which the passenger seat is configured to accept cargo,
the backrest being pivotable with respect to the seat portion about a pivot axis, the backrest being pivotable between a substantially upright orientation and a substantially horizontal orientation, the passenger seat being in the first configuration when the backrest is in the upright orientation and in the second configuration when the backrest is the horizontal orientation,
the pivot axis being disposed lower than the cargo rack,
the seat portion of passenger seat being movable between a first position and second position, the second position being lower than the first position, the seat portion being in the first position when the backrest is in the upright orientation and in the second position when the backrest is in the horizontal orientation.

17. A straddle-type wheeled vehicle comprising:
a frame;
at least three wheels supporting the frame, one of which is a front wheel and one of which is a rear wheel;
an engine disposed on the frame for driving at least one of the wheels;
handlebars disposed on the frame for steering at least one of the wheels;
a straddle driver seat disposed on the frame; and
a straddle passenger seat, disposed on the frame rearward of the driver seat the passenger seat comprising a seat portion and a backrest, the passenger seat transformable between a first configuration in which the passenger seat is configured to accept a passenger and a second configuration in which the passenger seat is configured to accept cargo;
the seat portion being in a first seat position when the passenger seat is in the first configuration and in a second seat position when the passenger seat is in the second configuration, the second seat position being different from the first seat position; and
the backrest being pivotable about a pivot axis between a first backrest position and a second backrest position, the backrest being in the first backrest position when the passenger seat is in the first configuration and in the second backrest position when the passenger seat is in the second configuration,
the pivot axis being disposed lower than the cargo rack.

18. The straddle-type wheeled vehicle as claimed in claim 17, wherein the passenger seat comprises a seat portion and a backrest.

19. The straddle-type wheeled vehicle as claimed in claim 18, wherein the backrest is pivotable with respect to the seat portion to transform the passenger seat between the first configuration and the second configuration.

* * * * *

UNITED STATES PATENT AND TRADEMARK OFFICE
CERTIFICATE OF CORRECTION

| | | |
|---|---|---|
| PATENT NO. | : 7,331,418 B2 | Page 1 of 1 |
| APPLICATION NO. | : 10/796392 | |
| DATED | : February 19, 2008 | |
| INVENTOR(S) | : Mathieu Audet | |

It is certified that error appears in the above-identified patent and that said Letters Patent is hereby corrected as shown below:

Column 7

Line 22, replace "ananged" with --arranged--.

Signed and Sealed this

Twenty-seventh Day of May, 2008

JON W. DUDAS
*Director of the United States Patent and Trademark Office*